(12) United States Patent
Wang et al.

(10) Patent No.: US 8,202,162 B2
(45) Date of Patent: Jun. 19, 2012

(54) APPARATUS AND METHOD OF IMPACT EMULATION FOR VIDEO GAMES

(76) Inventors: Shyh-Jye Wang, Irvine, CA (US);
Michael C. Wang, Irvine, CA (US);
Sung-En Wang, Irvine, CA (US)

( * ) Notice: Subject to any disclaimer, the term of this patent is extended or adjusted under 35 U.S.C. 154(b) by 0 days.

(21) Appl. No.: 13/204,667

(22) Filed: Aug. 6, 2011

(65) Prior Publication Data

US 2011/0287837 A1   Nov. 24, 2011

Related U.S. Application Data

(63) Continuation of application No. 12/077,981, filed on Mar. 24, 2008, now Pat. No. 8,002,635.

(51) Int. Cl.
*A63F 13/00* (2006.01)

(52) U.S. Cl. .................. 463/36; 463/3; 463/42

(58) Field of Classification Search .................. 463/2, 3, 463/4, 36, 37, 38, 42
See application file for complete search history.

(56) References Cited

U.S. PATENT DOCUMENTS

| | | | |
|---|---|---|---|
| 4,459,578 A | 7/1984 | Save et al. | |
| 5,863,255 A | 1/1999 | Mack | |
| 6,088,019 A | 7/2000 | Rosenberg | |
| 8,002,635 B2 | 8/2011 | Wang et al. | |
| 2003/0127863 A1 | 7/2003 | Ootori | |
| 2006/0055106 A1* | 3/2006 | Cohen | 273/108.1 |
| 2007/0080831 A1 | 4/2007 | Miyamoto | |
| 2008/0085790 A1 | 4/2008 | Englert | |
| 2008/0297328 A1 | 12/2008 | Crawford et al. | |
| 2009/0029793 A1 | 1/2009 | Cage | |
| 2009/0209343 A1 | 8/2009 | Foxlin et al. | |
| 2009/0216454 A1 | 8/2009 | Ziolkowski et al. | |

* cited by examiner

*Primary Examiner* — James S McClellan

(57) ABSTRACT

An impact emulator that provides impact effects to a player of a video game system is provided. The video game system has a magnetic field generator that is able to produce magnetic field to generate a force on a magnet on a remote controller. The amount of magnetic field to be produced is depending on the relative movement of the remote controller and a target element.

4 Claims, 5 Drawing Sheets

APPARATUS AND METHOD OF IMPACT EMULATION FOR VIDEO GAMES

This patent application is a continuation of U.S. application Ser. No. 12/077,981, filed on Mar. 24, 2008 now U.S. Pat. No. 8,002,635, the entire contents of which is expressly incorporated herein by reference.

FIELD OF THE INVENTION

The present invention relates to a video game system. In particular, to an impact emulator that produces impact reaction force to a video game player.

BACKGROUND OF THE INVENTION

An electronic video game is usually played by a user who interacts with a video game system through a user interface. Typically, the user reacts when there are visual activities displayed on an electronic video device such as a television screen. The "brain" of a video game system, also known as a platform, can be a personal computers or a video game console. The user interface, also known as a game controller, is typically a joystick used to give inputs to video games. The user interface can be different from platform to platform. For example, the number of buttons on a dedicated joystick may range from one to more than ten.

Beyond the common element of visual feedback, video games have utilized other means to provide interaction and information to the player. For example, sound effect is produced when there is a collision between a baseball bat and a baseball. On the other hand, when a reaction force is required to provide physical impact effect to a user when playing on a video game, for example, when a tennis ball is strike by a tennis racquet, a vibration on the game controller or handler is produced to emulate the impact reaction force.

Wii, designed by Nintendo, revolutionized video game's user interface. The key to Nintendo Wii's interface lies inside a controller. Instead of using a joystick to control the game, the primary control is the controller itself The controller contains solid-state accelerometers and gyroscopes that allow the controller to sense motions of the controller. A player holds the remote controller that maps a user's movement (the controller's movement actually) to joystick buttons. The video game system reflects the movement of the user by showing that on a display. The video game system also makes a reaction based on the algorithm stored in the system and shows that on the display accordingly.

When there is a collision between objects such as a baseball bat and a baseball, Wii makes impact effects by producing a "pop" sound and a vibration on the remote controller. However, the impact effects of Wii are not genuine since the "feel" of vibration is not comparable to the "feel" when one is using a real bat to hit a baseball because it does not reflect some important parameters, such as a reaction force applied on the hitter with a specific direction and strength. In addition, the user is expecting a feedback force when the ball is hit. If there is no such feedback force, the user may overuse his or her arm and that may cause injury to the user.

Using haptic peripherals to produce a reaction force such as that in video game arcade is not applicable to Wii since the remote controller is a free body and there is no physical contact between the remote controller and a solid reference such as the wall or the ground. Therefore, the arcade-type impact reaction force can not be provided on Wii.

SUMMARY OF THE INVENTION

It is an object of the present invention to provide an impact emulator that provides impact effects, especially to produce a reaction force to the player when the player moves a remote controller to make a hit on an object that displayed on a video display. It is another object of the present invention to provide a method that provides impact effects, especially to produce a feedback force to the player when the player moves a remote controller to make a hit on an object that displayed on a video display.

According to a first aspect of the present invention there is provided a video game system comprising a magnetic field generator, wherein the magnetic field generator dynamically produces magnetic field to generate a force on a permanent magnet on a remote controller, wherein the amount of magnetic field is produced according to the relative movement of the remote controller.

According to a second aspect of the present invention there is provided a video game system comprising a magnetic field generator, wherein the magnetic field generator produces a steady magnetic field to generate a force on an electromagnet attached to a remote controller, wherein the magnitude of the electromagnet is produced according to the relative movement of the remote controller.

According to a third aspect of the present invention there is provided a method for a video game system for generating an emulated force to a player, comprising the step of producing a magnetic field to generate a force on a permanent magnet on a remote controller, wherein the amount of magnetic field is produced according to the relative movement of the remote controller.

According to a fourth aspect of the present invention there is provided a method for a video game system for generating an emulated force to a player, comprising the step of producing a steady magnetic field to generate a force on an electromagnet attached to a remote controller, wherein the magnitude of the electromagnet is produced according to the relative movement of the remote controller.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein.

DETAILED DESCRIPTION OF THE INVENTION

Figure 1:
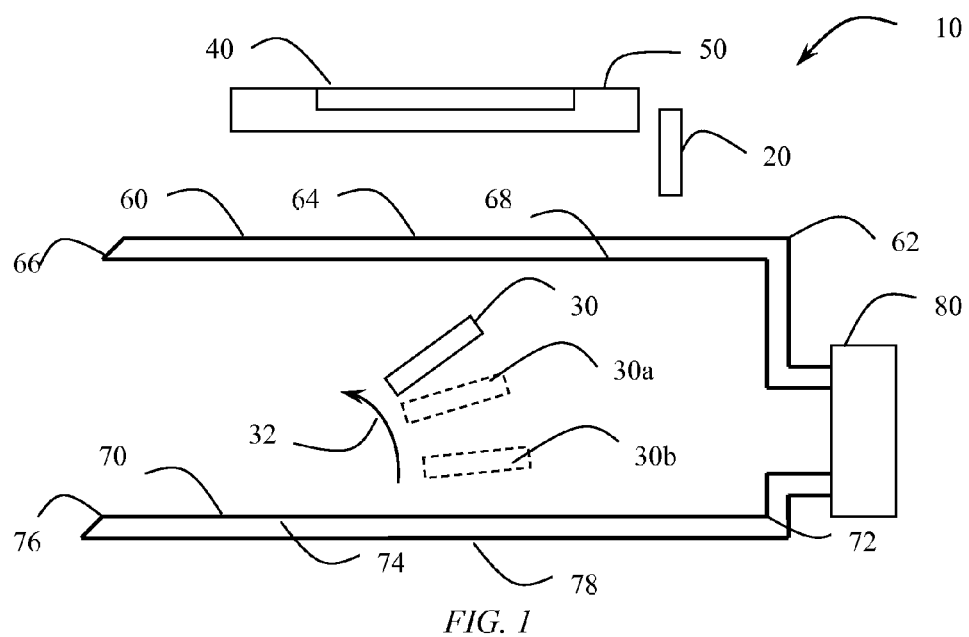
FIG. 1 shows a top view of major components in one embodiment of the present invention.
Figure 2:
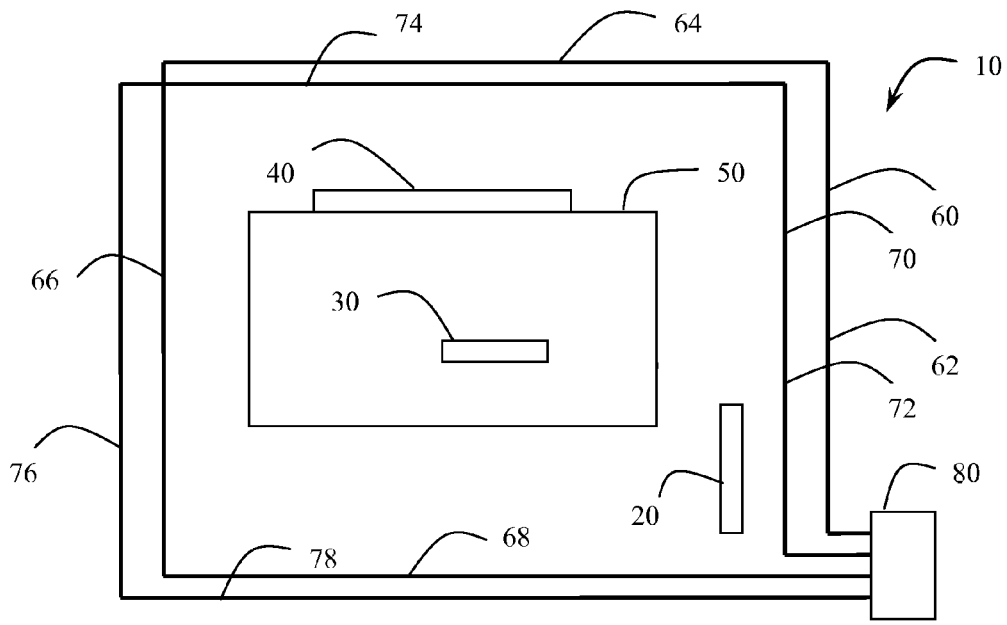
FIG. 2 shows a front view of major components in the embodiment of FIG. 1.

FIG. 1 shows a top view of major components of one exemplary video game system 10 of the present invention. FIG. 2 shows a front view of major components in the embodiment of FIG. 1. Referring to FIGS. 1 and 2, the video game system 10 has a console 20, a remote controller 30, a sensor bar 40, a video display 50, a plurality of electrical wires 60, 70, and a current generator 80.

The console 20 has a built-in microprocessor to execute software programs. The software program can be stored in a disk and can be read by the microprocessor of the console 20. The console 20 is electronically coupled to the sensor bar 40. The sensor bar 40 contains a plurality of LEDs. The console 20 is also electronically coupled to the video display 50. When there is a movement in the remote controller 30, the video game system 10 detects and reflects the movement by showing movements of two objects on the video display 50. One object represents the player who moves the controller 30 while the other object represents an opponent who can be another player of the video game system, sometimes also called the computer. The video game system 10 also makes a reaction on the opponent object based on the algorithm stored in the console 20 or just to reflect the reaction from another player and shows that on the display 50 accordingly.

The remote controller 30 is the primary controller for the console 20. The remote controller 30 has built-in accelerometers and gyroscopes. When the remote controller 30 is moving relatively to the LEDs within the sensor bar 40, the infrared detection is able to sense its position in 3D space on the remote controller 30. This enables users to control the game by moving physically as well as pressing buttons. As shown in FIG. 1, the remote controller 30 is swing by a player (not shown) in a desired direction 32 from a first position 30b (shown in dashed box) to a second position 30a (shown in dashed box) and to the current position 30. The remote controller 30 is able to sense its motions including: tilting and rotation up and down, tilting and rotation left and right, rotation along the main axis (as with a screwdriver), acceleration up and down, acceleration left and right, and acceleration toward and away from the sensor bar 40, or the video display 50 if the sensor bar 40 is placed near the display 50. The information of motions is sent to the console 20 for displaying on the display 50 and for calculating possible hit of an object.

In the embodiment of FIGS. 1 and 2, two wires 60, 70 are set up around the playing environment with a first wire 60 set up on the front side and a second wire 70 set up on the rear side. In other words, the first wire 60 is located between the video display 50 and the remote controller 30 while the remote controller 30 is located between the first wire 60 and the second wire 70.

The first wire 60 can have four segments that a first segment 62 is generally extended vertically from the ground to a position that is higher than the height of the player's hand when his or her arm is raised. A second segment 64 is generally extended horizontally from the top-right side of the player to the top-left side of the player. The second segment 64 can be fixed on its position by hangers. Alternatively, the second segment 64 can be fixed to the ceiling of the room where the video game system 10 is set up. A third segment 66 is extended generally vertically from where the second segment 64 ends to the ground. A fourth segment 68 goes horizontally and can be placed on the ground.

The second wire 70 can have a similar setting as the first wire 60. The second wire 70 also has four segments 72, 74, 76, 78 that placed around the playing environment. The second wire 70 is placed in parallel with the first wire 60 so that the distance between the first wire 60 and the second wire 70 is about the same between each corresponding segments. For demonstration purpose, the wires 60, 70 in FIG. 2 are shown in skewed positions. They are preferred to be placed at the same level for each segment. Especially, the fourth segments 68, 78 can both be placed on the ground. The way it shows that segment 68 is higher than wire 78 is just for demonstration purpose.

In the embodiment of FIGS. 1-2, the wires 60, 70 are set up as a square and the distance between the two wires is about one half of the side length of the square. For example, assuming that the height of the first segments 62 is two meters, it is preferred that all other segments 64, 66, 68, 72, 74, 76, 78 are also about two meters long and the distance between the first wire 60 and the second wire 70 is about one meter.

In another embodiment, the first wire 60 and the second wire 70 can each be shaped as a circle. In that case, it is preferred that the first wire 60 and the second wire 70 have the same radius and the distance between the first wire 60 and the second wire 70 is about the same as the radius of the circles.

The current generator 80 has input ports and output ports. The first segment 62 of the first wire 60 is electrically coupled to one of the output ports of the current generator 80 and the fourth segment 68 of the first wire 60 is electrically coupled to one of the input ports of the current generator 80. Similarly, the first segment 72 of the second wire 70 is electrically coupled to one of the output ports of the current generator 80 and the fourth segment 78 of the second wire 70 is electrically coupled to one of the input ports of the current generator 80.

Figure 3:
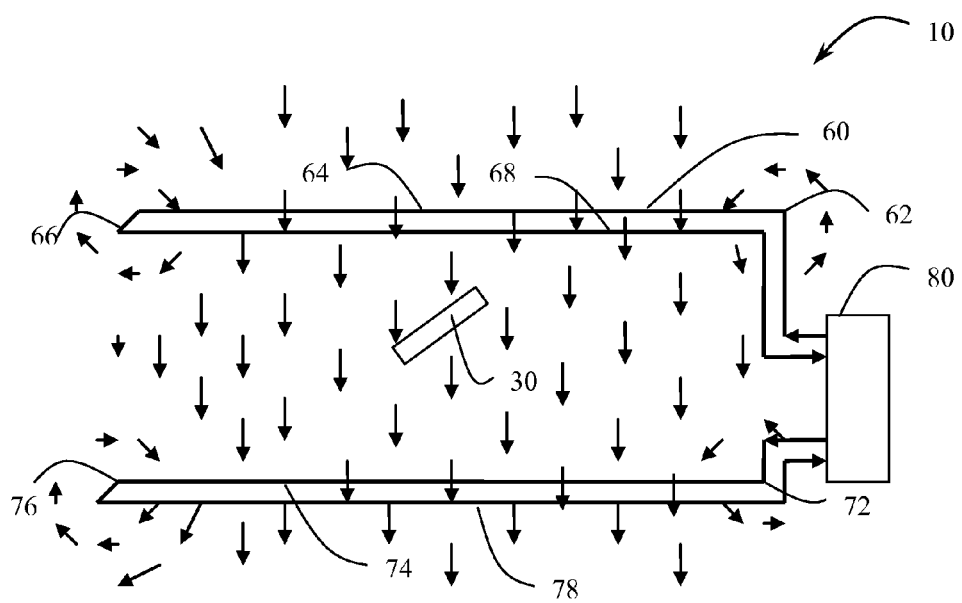
FIG. 3 shows a magnetic field distribution of FIG. 1 when impulse currents are applied.
Figure 4:
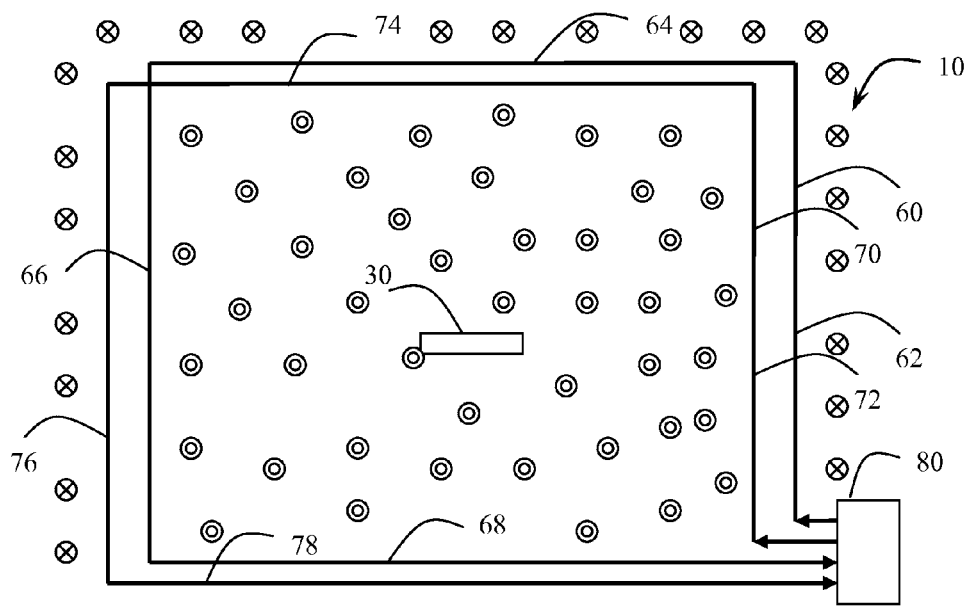
FIG. 4 shows a magnetic field distribution of FIG. 2 when impulse currents are applied.

FIG. 3 shows a magnetic field distribution of FIG. 1 when impulse electrical current is applied to wires 60, 70 by the current generator 80. FIG. 4 shows a magnetic field distribution of FIG. 2 when impulse electrical current is applied. The direction of impulse electrical current flow is shown by arrows on wires 60, 70. In the first wire 60, the impulse electrical current is flow out from the current generator 80 to the first segment 62, the second segment 64, the third segment 66, the fourth segment 68, and finally flow back to the current generator 80. Similarly, in the second wire 70, the impulse electrical current is flow out from the current generator 80 to the first segment 72, the second segment 74, the third segment 76, the fourth segment 78, and flow back to the current generator 80.

Based on the Ampère-Maxwell equation, induced magnetic field can be produced by the change of electrical field, which can be produced by an electrical current, as shown in the second term on the right hand side of the following equation:

$$\mathrm{curl}(B) = \mu_0 J + \mu_0 \epsilon_0 \partial E / \partial t$$

where curl(B) is the curl of the magnetic field in teslas, $\mu_0$ is the permeability constant ($4\pi \times 10^{-7}$ Tm/A), $\epsilon_0$ is the vacuum permittivity, and E is the electric field.

Arrows in FIG. 3 represent magnetic field vectors in a plane bisecting the wires 60, 70. Note that the magnetic field is approximately uniform between the wires 60, 70. In FIG. 4, the magnetic field vectors pointing out of the page are denoted by double circles when they are within the loop of wires. The magnetic field vectors pointing into the page are denoted by an x in circle when they are outside the loop of wires. Therefore, once the current is turned on, a temporarily magnetic field will be generated by the impulse electrical current. The timing of when and how much magnetic field needed to be generated will be described below with the interaction of the remote controller 30.

Figure 5:
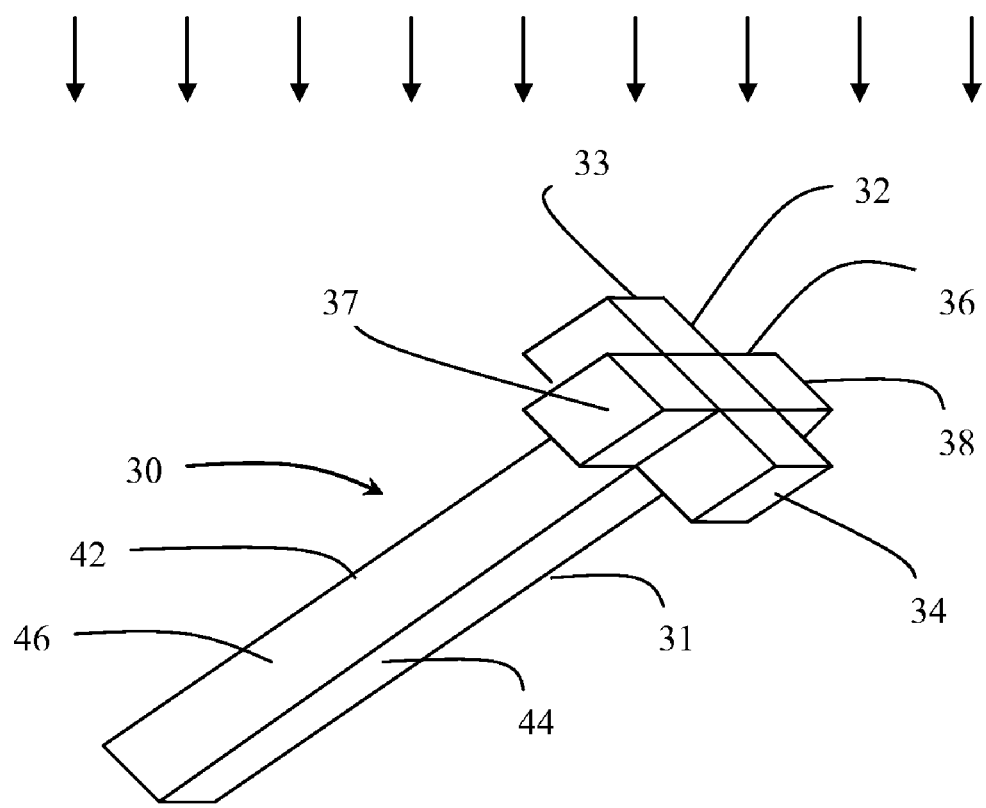
FIG. 5 shows an enlarged perspective view of one embodiment of a remote controller in FIGS. 1-4.

FIG. 5 shows an enlarged perspective view of the remote controller 30 of FIGS. 1-4. The remote controller 30 has a handle 31 with a first permanent magnets 32 and a second permanent magnets 36 attached thereto. The second permanent magnet 36 longitudinally perpendicular to the first permanent magnet 32. The handle 31 has a front face 42, a rear face 44, a left face 46, and a right face (not shown). The first permanent magnet 32 has a first pole 33 and a second pole 34 while the second permanent magnet 36 has a first pole 37 and a second pole 38. The face of the first pole 33 of the first permanent magnet 32 is parallel to the front face 42 of the handle 31. The face of the second pole 34 of the first permanent magnet 32 is parallel to the rear face 44 of the handle 31. The face of the first pole 37 of the second permanent magnet 36 is parallel to the left face 46. The face of the second pole 38 of the second permanent magnet 36 is parallel to the right face 48 of the handle 31. The orientation as well as the strength of the permanent magnets 32, 36 are calibrated and stored in the console 20 by, for example, the manufacturing.

When a user turns on the video game system 10, the system 10 detects the position of the wires 60, 70. This detection can be made by placing sensor tabs on the four corners of each wire 60, 70. Based on the placement of the wires 60, 70, the magnitude of induced magnetic field at each point in space between the loop of wires 60, 70 can be calculated when a known impulse electrical currents are applied to wires 60, 70 by the current generator 80. Therefore, when a user is playing, the system 10 detects the relative acceleration and direction of the movement between the remote controller 30 and a target. The position of both the remote controller 30 and the target are shown on the display 50 as they move. The system 10 predicts the timing and location a strike or a hit will occur. The system 10 then utilizes vector arithmetic to calculate the amount and direction of an impact reaction force that will be occurred by such a hit based on the speed, acceleration, and direction of the remote controller 30 and also the target. Once the desired impact reaction force is known, the current generator 80 generates a suitable impulse currents to both wires 60, 70. The impulse currents then generate a desired induced magnetic field as shown in FIGS. 3 and 4.

The calculation of magnetic field is briefly described below. A pair of two identical cylindrical wires are placed side-by-side one on each side of the environment as shown in FIGS. 1-4 and 6-7, and separated by a distance h equal to one half of the side or radius R of the wire. Each wire carries an equal electrical current flowing in the same direction. Setting h=R, minimizes the non-uniformity of the magnetic field at the center of the wires, in the sense of setting $d^2B/dx^2=0$, but leaves a small amount of variation in field strength between the center and the planes of the wires. A slightly larger value of h reduces the difference in field between the center and the planes of the wires, at the expense of decreasing the field's uniformity in the region near the center, as measured by $d^2B/dx^2$.

The calculation of the magnetic field at central point along the axis of the pair of wires is described below. It is convenient to think about the Taylor series expansion of the field strength as a function of x, the distance from the central point of the wire-pair along the axis. By symmetry the odd order terms in the expansion are zero. By separating the wires so that x=0 is an inflection point for each wire separately, it can be expected that the order $x^2$ term is also zero, and hence the leading non-uniform term is of order $x^4$. The inflection point for a simple wire is R/2 from the wire center along the axis. As a result, the location of each wire at $x=\pm R/2$. If the current flowing through the wires is I, then the magnetic flux density, B at the midpoint between the wires will be given by B equals to $(4/5)^{3/2}\mu_0 I/R$, where $\mu_0$ is the permeability constant ($1.26 \times 10^{-6}$ Tm/A), and R is in meters. The calculation of the exact magnetic field at any point in space is more complicate since it involves Bessel functions. The mathematical functions can be programmed into software form and stored in a memory that can be accessed by the microprocessor of the console 20. Alternatively, the mathematical functions can be implemented in hardware so the exact magnetic field at any point in space can be calculated in a "real-time" fashion.

The generated induced magnetic field thus generates a force on the permanent magnets 32, 36 of the remote controller 30. The system 10 emulates the impact reaction force by creating a magnetic field that generates a force in a direction against the direction of the movement of the remote controller 30. The magnetic field that can be changed dynamically according to the movement of the remote controller 30. The timing, direction and magnitude of the magnetic field are determined by the microcontroller embedded in the console 20 based on the information about the relative movement between the player and an object, the way the player holds the remote controller, and the setting of the pair of wires 60, 70. The player therefore senses the impact reaction force when he or she strikes a ball.

The remote controller 30 connects to the console 20 using Bluetooth and features rumble as well as an internal speaker. When there is a hit between objects such as a baseball bat and a baseball, the system 10 produces a "pop" sound and makes an impact reaction force on the remote controller 30. The synchronized sound and the impact reaction force make the video game system 10 "real" to a player by emulating the real-life experiences.

Following is an example of a tennis game played by a right-handed player on the video game system 10. The player holds the remote controller 30 use the right hand as if he or she is holding a tennis racquet. Video display 50 displays a player holding a tennis racquet that represents the player while the opponent can be another human player or the computer. For a right-handed player, to play a forehand, the player moves the racquet from the right side of the player's body, continues across the body as contact is made with the ball, and ends on the left side of the body. To play a backhand, the player moves the racquet from the left side of the body, continues across the body as contact is made with the ball, and ends on the right side of the body.

When the player plays a forehand, the face of the first pole 33 of the permanent magnet 32 will first face the display 50 and then the face of the second pole 38 will face the display 50. The system 10 detects the acceleration and direction of the relative movement between the remote controller 30 and the target tennis ball served by the opponent. The position of both the remote controller 30 and the target tennis ball are shown on the display 50 as they move. The system 10 predicts the timing and location of a strike or a collision between the tennis racquet and the target tennis ball will occur. The system 10 then calculates the amount and direction of an impact force and its reaction force that will be produced by such a hit based on the speed, acceleration, and direction of the remote controller 30 and the target tennis ball.

Just before the face of the first pole 33 is going to face the display 50, the system 10 creates an impulse current that induces a suitable magnetic field in a direction as shown of FIGS. 3 and 4 based on the desired impact reaction force. The magnetic field therefore creates a magnetic force emulating the impact reaction force on the permanent magnet 32 and the player can feel it. The system 10 keeps on monitoring the direction and position of the remote controller 30. When the motion continues for a 90° turn and just before the face of the second pole 38 of the permanent magnet 36 is facing the display 50, the system 10 turns off the current from the current generator 80. This current change in wires 60, 70 then generates a magnetic field in the opposite direction as shown in FIGS. 3 and 4. Since the face of the second pole 38 is now facing the display 50, the magnetic force emulating the impact reaction force is also acting on the permanent magnet 36 and the player will be able to feel it.

Thus, when the hand of a player is moving around his or her body, the system 10 detects the swing and generates magnetic force two times within a 90° turn of the remote controller 30. These two consecutive forces happened in a short period of time that the player may "feel" just like one hit of a tennis ball with an elastic tennis racquet.

When the player plays a backhand, the face of the second pole 34 of the permanent magnet 32 will first face the display 50 and then the face of the first pole 37 will face the display 50. Just before the face of the second pole 34 is going to face the display 50, the system 10 generates an impulse current that generates a suitable magnetic field in a direction opposite to the arrows shown of FIGS. 3 and 4. The magnetic field therefore creates a magnetic force emulating the impact reaction force on the permanent magnet 32 of the remote controller 30 and also the player's hand. When the motion continues for a 90° turn and just before the face of the first pole 37 of the permanent magnet 36 is facing the display 50, the system 10 turns off the current from the current generator 80. This current change is then generates a magnetic field that is in the same direction as shown in FIGS. 3 and 4. Since the face of the first pole 37 is now facing the display 50, the magnetic force emulating the impact reaction force is also acting on the permanent magnet 36 of the remote controller 30 and also the player's hand.

Figure 6:
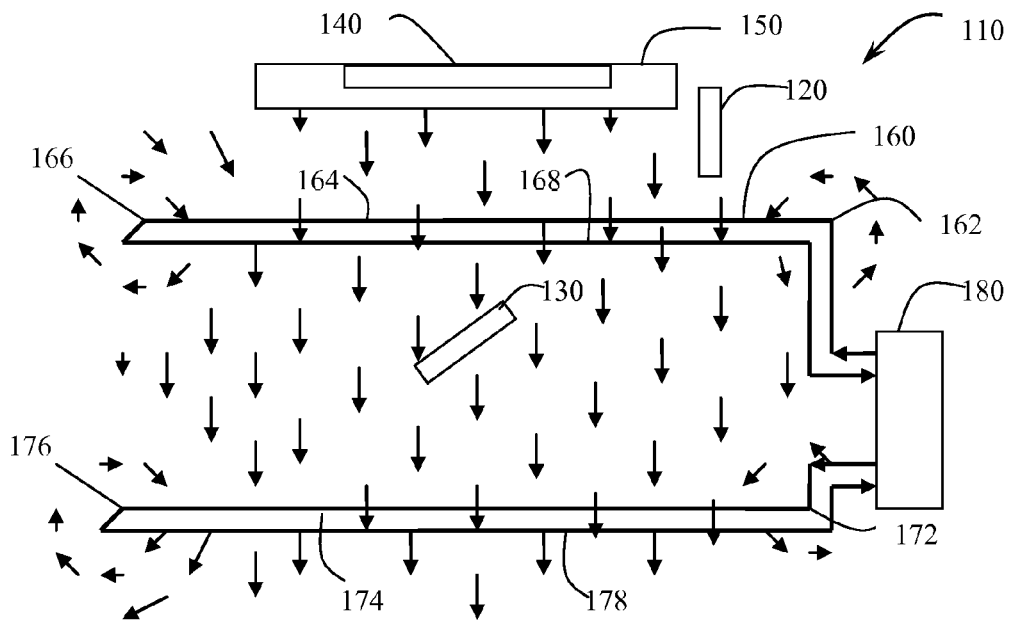
FIG. 6 shows a top view of major components and magnetic field distribution in a second embodiment of the present invention.
Figure 7:
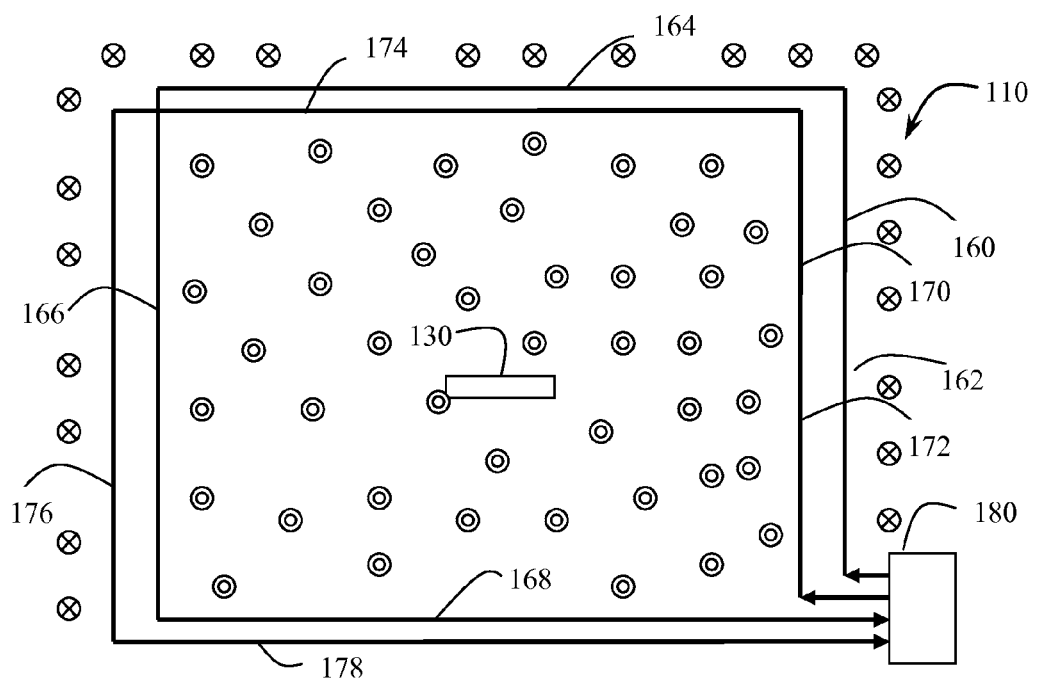
FIG. 7 shows a front view of major components and magnetic field distribution in the embodiment of FIG. 6.

FIG. 6 shows a top view of major components and magnetic field distribution in a second exemplary video game system 110 of the present invention. FIG. 7 shows a front view of major components and magnetic field distribution in the embodiment of FIG. 6. For purpose of demonstration, not all components in FIG. 6 are shown in FIG. 7.

The main difference between FIG. 6 and FIG. 3 is that in FIG. 6, a steady DC current is generated by the current generator 180 so that there is a steady magnetic field within the wire loops 160, 170. Referring to FIGS. 6 and 7, the video game system 110 has a console 120, a remote controller 130, a sensor bar 140, a video display 150, a plurality of electrical wires 160, 170, and a DC current generator 180.

The console 120 has a built-in microprocessor to execute software programs that stored in a disk and can be read by a disk drive of the console 120. The console 120 is electronically coupled to the sensor bar 140 which contains a plurality of LEDs. The console 120 is also electronically coupled to the video display 150. Typically, the sensor bar 140 is placed on top of the display without movement. When there is a movement between the remote controller 130 and the sensor bar 140, the video game system 110 detects and reflects the movement by showing that movement on the video display 150. The video game system 110 also makes a reaction based on the algorithm stored in the console 120 and shows that on the display 150 accordingly.

The remote controller 130 is the primary controller for the console 120. The remote controller 130 has built-in accelerometers and gyroscopes. When the remote controller 130 is using with the LEDs within the sensor bar 140, the infrared detection is able to sense its position in 3D space. Users control the game by using physical gestures as well as pressing buttons. The remote controller 130 is able to sense its motions including: tilting and rotation up and down, tilting and rotation left and right, rotation along the main axis (as with a screwdriver), acceleration up and down, acceleration left and right, and acceleration toward and away from the sensor bar 140, or the video display 150 if the sensor bar 140 is placed near the display 150.

In the embodiment of FIGS. 6 and 7, two wires 160, 170 are set up around the playing environment with a first wire 160 set up on the front side and a second wire 170 set up on the rear side. In other words, the first wire 160 is located between the video display 150 and the remote controller 130 while the remote controller 130 is located between the first wire 160 and the second wire 170.

The first wire 160 can have four segments that a first segment 162 is generally extended vertically from the ground to a position that is higher than the height of the player's hand when his or her arm is raised. A second segment 164 is generally extended horizontally from the top-right side of the player to the top-left side of the player. The second segment 164 can be fixed on its position by hangers. Alternatively, the second segment 164 can be fixed to the ceiling of the room where the video game system 110 is set up. A third segment 166 is extended generally vertically from where the second segment 164 ends to the ground. A fourth segment 168 goes horizontally and can be placed on the ground.

The second wire 170 can have a similar setting as the first wire 160. The second wire 170 also has four segments 172, 174, 176, 178 that placed around the playing environment. The second wire 170 is placed in parallel with the first wire 160 so that the distance between the first wire 160 and the second wire 170 is about the same between each corresponding segments. Although FIG. 7 is a front view and the wires 160, 170 are shown in skew. Especially, the fourth segments 168, 178 can be both placed on the ground. The way it shows that segment 168 is higher than wire 178 is just for demonstration purpose.

In the embodiment of FIGS. 6-7, the wires 160, 170 are set up as a square and the distance between the two wires is about one half of the side of the square. For example, assuming that the height of the first segments 162 is two meters, it is preferred that all other segments 164, 166, 168, 172, 174, 176, 178 are also about two meters and the distance between the first wire 160 and the second wire 170 is about one meter.

In another embodiment, the first wire 160 and the second wire 170 can each be shaped as a circle. In that case, it is preferred that the first wire 160 and the second wire 170 have the same radius and the distance between the first wire 160 and the second wire 170 is about the same as the radius of the circles.

The current generator 180 has input ports and output ports. The first segment 162 of the first wire 160 is electrically coupled to one of the output ports of the current generator 180 and the fourth segment 168 of the first wire 160 is electrically coupled to one of the input ports of the current generator 180. Similarly, the first segment 172 of the second wire 170 is electrically coupled to one of the output ports of the current generator 180 and the fourth segment 178 of the second wire 170 is electrically coupled to one of the input ports of the current generator 180.

FIG. 6 also shows a magnetic field distribution when steady DC electrical currents are applied to wires 160, 170 by the current generator 180 while FIG. 7 shows the front view. The direction of DC electrical current flow is shown by arrows on wires 160, 170. In the first wire 160, the steady electrical current is flow out from the current generator 180 to the first segment 162, the second segment 164, the third segment 166, the fourth segment 168, and then flow back to the current generator 180. Similarly, in the second wire 170, the impulse electrical current is flow out from the current generator 180 to the first segment 172, the second segment 174, the third segment 176, the fourth segment 178, and flow back to the current generator 180.

Based on the Ampère-Maxwell equation, magnetic field can be produced by the steady electrical current as shown in the first term on the right hand side of the following equation:

$$\mathrm{curl}(B) = \mu_0 J + \mu_0 \epsilon_0 \partial E/\partial t$$

where J is the current density in amperes per square meter.

Arrows in FIG. 6 represent magnetic field vectors in a plane bisecting the wires 160, 170. Note that the magnetic field is approximately uniform in between the wires 160, 170. In FIG. 7, the magnetic field vectors are point out from the page and denoted by double circles when they are within the loop of wires. The magnetic field vectors are point into the page and denoted by an x in circle when they are outside the loop of wires. Therefore, a steady magnetic field is generated by DC electrical currents.

Figure 8:
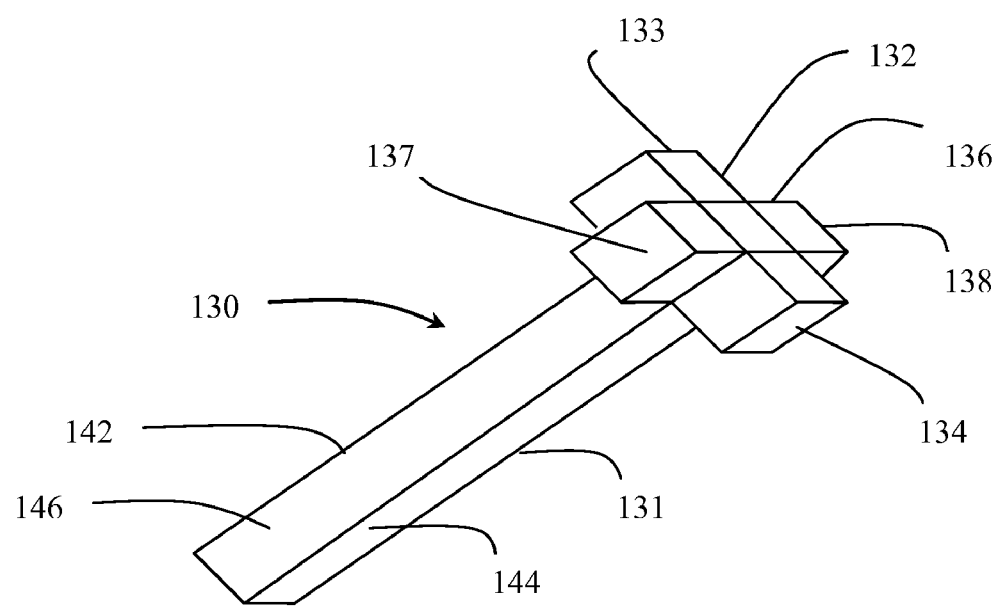
FIG. 8 shows an enlarged perspective view of one embodiment of a remote controller in FIGS. 6 and 7.

FIG. 8 shows an enlarged perspective view of the remote controller 130 of FIGS. 6-7. The remote controller 130 has a handle 131 with two electromagnets 132, 136 attached. The handle 131 has a front face 142, a rear face 144, a left face 146 and a right face 148 (not shown). The first electromagnet 132 has a first end 133 and a second end 134 while the second electromagnet 136 has a first end 137 and a second end 138. The face of the first end 133 is parallel to the front face 142. The face of the second end 134 is parallel to the rear face 144. The face of the first end 137 is parallel to the left face 146. The face of the second end 138 is parallel to the right face 148. The orientation as well as the strength of the electromagnets 132, 136 are stored in the console 120 by manufacturing.

When a user turns on the video game system 110, the system 110 detects the position of the wires 160, 170. This detection can be made by placing tabs on the four corners of each wire 160, 170. Based on the placement of the wires 160, 170, the magnitude of magnetic field within the loop of wires 160, 170 can be calculated when electrical currents are applied to wires 160, 170 by the current generator 180. Therefore, when a user is playing, the system 110 uses the acceleration and direction of the movement of the remote controller 130 to calculate the amount of force required and the timing to produce the impact reaction force. Once the desired impact reaction force is known, the system 110 creates a temporary magnet on the electromagnets 132, 136. The steady magnetic field thus generates a magnetic force emulating the impact reaction force on the electromagnets 132, 136 of the remote controller 130. The user therefore senses the impact reaction force when he or she strikes a ball.

Following is an example of a tennis game played by a right-handed player with the system 110. When the player plays a forehand, the face of the first end 133 of the electromagnet 132 will first face the display 150 and then the face of the second end 138 will face the display 150. Just before the face of the first end 133 is going to face the display 150, the controller 130 set the first end 133 as the north pole with a desired magnitude based on the calculation previously described. The magnetic field generated by the wires 160, 170 creates a magnetic force on the electromagnet 132 of the remote controller 130 to emulate the calculated impact reaction force. When the motion continues for a 90° turn and just before the face of the second end 138 of the electromagnet 136 is facing the display 150, the controller 130 set the second end 138 of the electromagnet 136 as the north pole with a desired magnitude. The magnetic force created by magnetic field generated by the wires 160, 170 acting on the electromagnet 136 of the remote controller 130 to emulate the calculated impact reaction force.

Therefore, when the hand of a player is moving around his or her body, the system 110 detects the swing and generates magnetic force two times within a 90° turn of the controller 130. These two consecutive forces happened in a short period of time that the player may "feel" just like one hit of a tennis ball with an elastic tennis racquet.

When the player plays a backhand, the face of the second end 134 of the electromagnet 132 will first face the display 150 and then the face of the first end 137 of the electromagnet 136 will face the display 150. Just before the face of the second end 134 is going to face the display 50, the controller 130 set the second end 134 of the electromagnet 132 as the north pole with a desired magnitude based on a calculation described previously. The magnetic field generated by the wires 160, 170 creates a magnetic force on the electromagnet 132 of the remote controller 130 to emulate the impact reaction force. When the motion continues for a 90° turn and just before the face of the first end 137 of the electromagnet 136 is facing the display 150, the controller 130 set the first end 137 of the electromagnet 136 as the north pole with a desired magnitude so that a magnetic force is also applied on the electromagnet 136 of the remote controller 130 to emulate the impact reaction force.

In the exemplary embodiments described previously, although tennis is used as example, it is understandable that the exemplary embodiments also applied to other games such baseball, golf, or boxing.

Although the remote controller 30, 130 shown previously is in a shape like a traditional TV remote control, it can be embedded in any shape as desired. For example, the remote controller 30, 130 can be embedded in a boxer glove so that when a player is playing a box game with the system 10, 110, he or she can feel the impact reaction force when he or she strikes the opponent shown on the display 50, 150.

Various modifications and alternative embodiments such as would ordinarily occur to one skilled in the art to which the invention relates are also contemplated and included within the scopes of the invention described and claimed herein.

We claim:

1. A video game system comprising:
 a console having a microcontroller;
 a sensor bar electrically coupled to the console;
 a remote controller having at least a first electromagnet; and
 a magnetic field generator for generating a magnetic field to produce a desired force on the first electromagnet, wherein no part of the magnetic field generator is deposited within the remote controller, wherein the amount of the desired force is produced according to a relative movement between the remote controller and the sensor bar.

2. The video game system of claim 1 further comprising a video display electrically coupled to the console.

3. The video game system of claim 1, wherein the amount of the desired force is calculated by a software program processed by the microcontroller.

4. A method for a video game system for generating an emulated impact reaction force to a player comprising the steps of:
 producing a steady magnetic field by a magnetic field generator, wherein no part of the magnetic field generator is deposited within a remote controller;
 detecting a relative movement between the remote controller and a target object;
 predicting a timing, direction, and magnitude of a hit between the remote controller and the target object;
 calculating the direction and magnitude of an impact reaction force by the hit; and
 generating an electromagnet on the remote controller according to the relative movement to produce a force emulating the impact reaction force.

* * * * *